US006769042B2

(12) United States Patent
Kato et al.

(10) Patent No.: US 6,769,042 B2
(45) Date of Patent: Jul. 27, 2004

(54) SELECTIVELY COUPLING ONE OF TWO INTERFACES IN AN EXTERNAL MEMORY APPARATUS TO A PERSONAL COMPUTER DEPENDING UPON A CONFIGURATION OF THE COMPUTER AND A SINGLE BUS INTERFACE

(75) Inventors: Yoshiyuki Kato, Kanagawa-ken (JP); Yasuhiro Kinoshita, Kanagawa-ken (JP); Daisuki Nagai, Kanagawa-ken (JP); Masanori Matsunaga, Kanagawa-ken (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/354,715

(22) Filed: Jan. 30, 2003

(65) Prior Publication Data

US 2003/0120833 A1 Jun. 26, 2003

Related U.S. Application Data

(62) Division of application No. 09/545,488, filed on Apr. 10, 2000, now Pat. No. 6,539,442, which is a continuation-in-part of application No. 08/985,584, filed on Dec. 5, 1997, now abandoned, which is a continuation of application No. 08/276,440, filed on Jul. 18, 1994, now abandoned.

(30) Foreign Application Priority Data

Jul. 28, 1993 (JP) .............................................. 5-041032

(51) Int. Cl.[7] .............................................. G06F 13/10
(52) U.S. Cl. .............................. 710/74; 710/36; 710/38; 710/62; 710/72
(58) Field of Search ................................. 710/8, 10, 11, 710/14–16, 62, 74, 300–306, 313, 315, 38, 36, 72

(56) References Cited

U.S. PATENT DOCUMENTS

| | | | |
|---|---|---|---|
| 5,023,831 A | | 6/1991 | Bonke et al. |
| 5,202,856 A | * | 4/1993 | Glider et al. .......... 365/230.05 |
| 5,434,722 A | * | 7/1995 | Bizjak et al. .................. 360/69 |
| 5,590,375 A | | 12/1996 | Sangveraphunsiri et al. |
| 5,649,233 A | | 7/1997 | Chen |
| 5,805,921 A | | 9/1998 | Kikinis et al. |
| 5,832,244 A | * | 11/1998 | Jolley et al. ................. 710/305 |
| 6,038,624 A | * | 3/2000 | Chan et al. .................. 710/302 |
| 6,170,020 B1 | * | 1/2001 | Blakeney et al. ............. 710/10 |
| 6,546,440 B1 | * | 4/2003 | Verinsky et al. .............. 710/62 |

FOREIGN PATENT DOCUMENTS

JP          10-124444          5/1998

OTHER PUBLICATIONS

"An IDE device Configuration Scheme with Reset Signal" IBM RD v42 n417 01–99 article 417108.

* cited by examiner

Primary Examiner—Iiwoo Park
(74) Attorney, Agent, or Firm—Fattibene & Fattibene; Paul A. Fattibene; Arthur T. Fattibene

(57) ABSTRACT

A CD-ROM apparatus is provided with an IDE-BUS interface and an ISA-BUS interface and a switching circuit for switching there between. In another embodiment invention is provided to simplify building a personal computer having a CD-ROM apparatus as an external memory and using an IDE-BUS I/F for connecting to the CD-ROM apparatus. Thus a hard disk unit is connected to a master partition of the IDE-BUS I/F of the personal computer, and the CD-ROM apparatus is connected to a slave partition of the IDE-BUS interface.

18 Claims, 3 Drawing Sheets

SELECTIVELY COUPLING ONE OF TWO INTERFACES IN AN EXTERNAL MEMORY APPARATUS TO A PERSONAL COMPUTER DEPENDING UPON A CONFIGURATION OF THE COMPUTER AND A SINGLE BUS INTERFACE

CROSS REFERENCE TO RELATED PATENT APPLICATIONS

This application is a division of U.S. patent application Ser. No. 09/545,488, filed Apr. 10, 2000, now U.S. Pat. No. 6,539,442; which is a continuation-in-part of U.S. patent application Ser. No. 08/985,584, filed Dec. 5, 1997, now abandoned; which is a continuation of U.S. patent application Ser. No. 08/276,440, filed Jul. 18, 1994, now abandoned; which claims priority under 35 U.S.C. §119 to Japanese Patent Application No. 5-041032, filed Jul. 28, 1993, and all being incorporated by reference herein for all purposes.

BACKGROUND OF THE INVENTION

This invention relates to a CD-ROM (compact disk read only memory) apparatus and, more particularly, to a CD-ROM apparatus used as an external memory of a personal computer.

DESCRIPTION OF THE RELATED TECHNOLOGY

A general connection example of a conventional CD-ROM apparatus of this type for a personal computer system will be described by referring to FIG. 2 (Prior Art). Numeral 1 denotes a body of a personal computer, and numeral 2 designates a CPU. A ROM 3 and a RAM 4 of an internal memory are connected to the CPU 2. The CPU 2 is connected to an AT-BUS 6 through a BUS controller 5, and further connected to devices through the AT-BUS 6.

On the other hand, with respect to an external memory, an IDE-BUS I/F (interface) 7 is connected to the AT-BUS 6, and hard disk devices 8 are connected to the IDE-BUS I/F 7 through an IDE-BUS 9. In this case, the hard disk devices 8 can be connected to the IDE-BUS I/F 7 according to the IDE standards. An ISA-BUS I/F 10 is connected to the AT-BUS 6. An I/F CARD connector 12 is connected to the ISA-BUS I/F 10 through an ISA-BUS 11, and a CD-ROM apparatus 13 containing an I/F 13a corresponding in operation to the ISA-BUS standard is connected to the IF/CARD connector 12 through an I/F CABLE 14.

The conventional CD-ROM apparatus of the personal computer, as described above, is corrected to the ISA-BUS I/F 10 through the I/F CARD connector 12. That is, when the CD-ROM apparatus 13 is used as an external memory, the I/F CARD connector 12 and the I/F CABLE 14 are required in addition to the CD-ROM apparatus 13. When the user connects the CD-ROM apparatus 13 to the personal computer 1, it is necessary to supply and set the I/F CARD connector 12 into the computer 1.

Therefore, eliminating the I/F CABLE 14 and the I/F CARD connector 12 would make for a simpler connection of the CR-ROM apparatus 13 to the computer 1.

Accordingly, it is an object of this invention to provide a CD-ROM apparatus which can simplify and reduce expenses in construction of a personal computer system.

SUMMARY OF THE INVENTION

The present invention achieves the above-described object, by providing a CD-ROM apparatus comprising an IDE interface, wherein a hard disk unit and the CD-ROM apparatus are connected in cascade with the IDE interface (IDE I/F) of a personal computer.

The IDE I/F of the personal computer is partitioned for both master and slave devices. The hard disk unit is ordinarily connected to the master partition. Further, the CD-ROM apparatus is ordinarily connected to the slave partition of the IDE I/F of the personal computer. Thus, the CD-ROM apparatus is connected in cascade with the hard disk unit on an IDE-BUS connected to the IDE I/F. However, according to an embodiment of the present invention, the CD-ROM apparatus may be connected to the master partition and the hard disk connected to the slave partition of the IDE I/F by changing the logic state of a drive selection bit in the IDE bus interface.

DETAILED DESCRIPTION OF PREFERRED EMBODIMENTS

Figure 1:
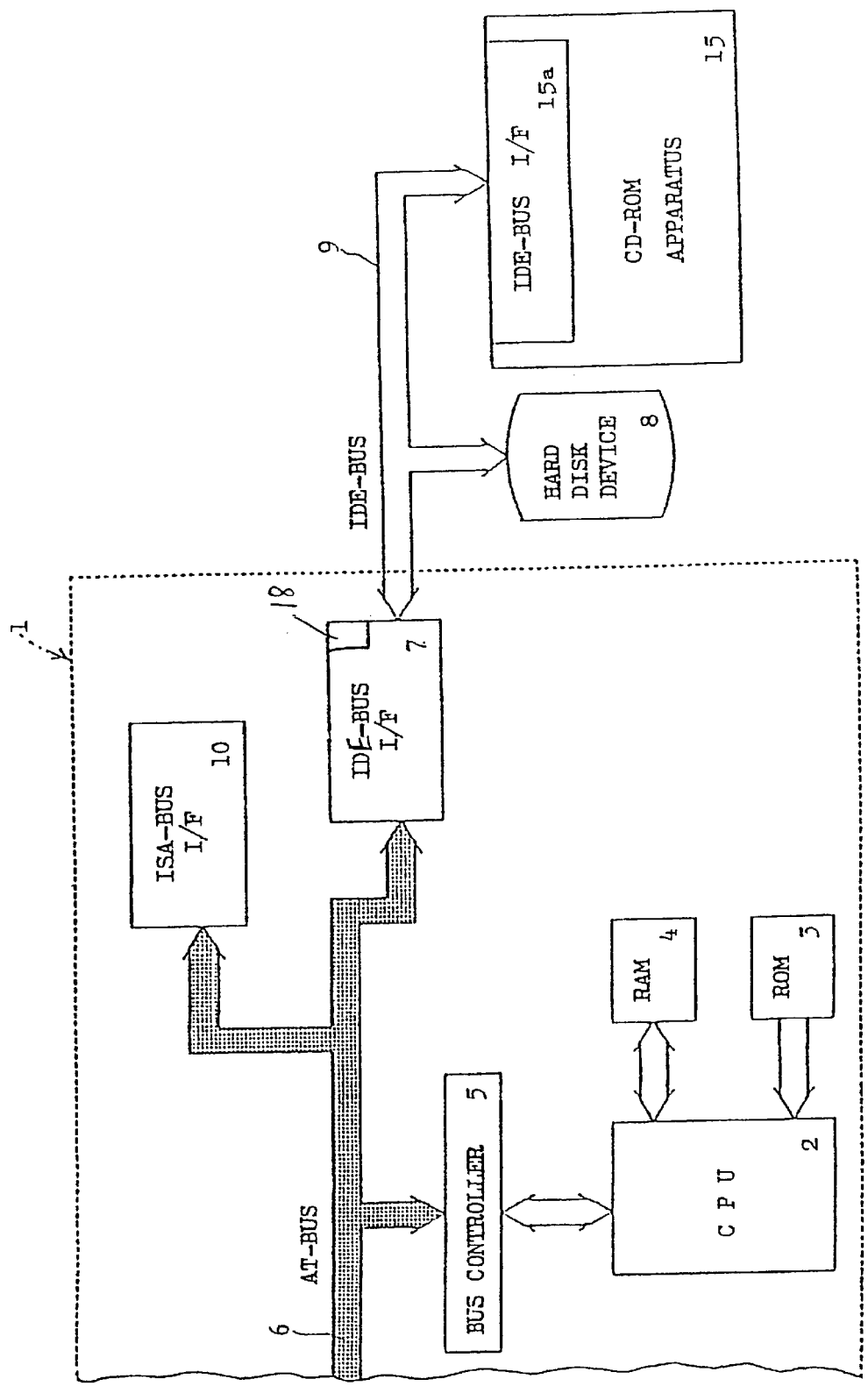
FIG. 1 is a schematic block diagram of a computer system according to an embodiment of this invention.
Figure 1A:
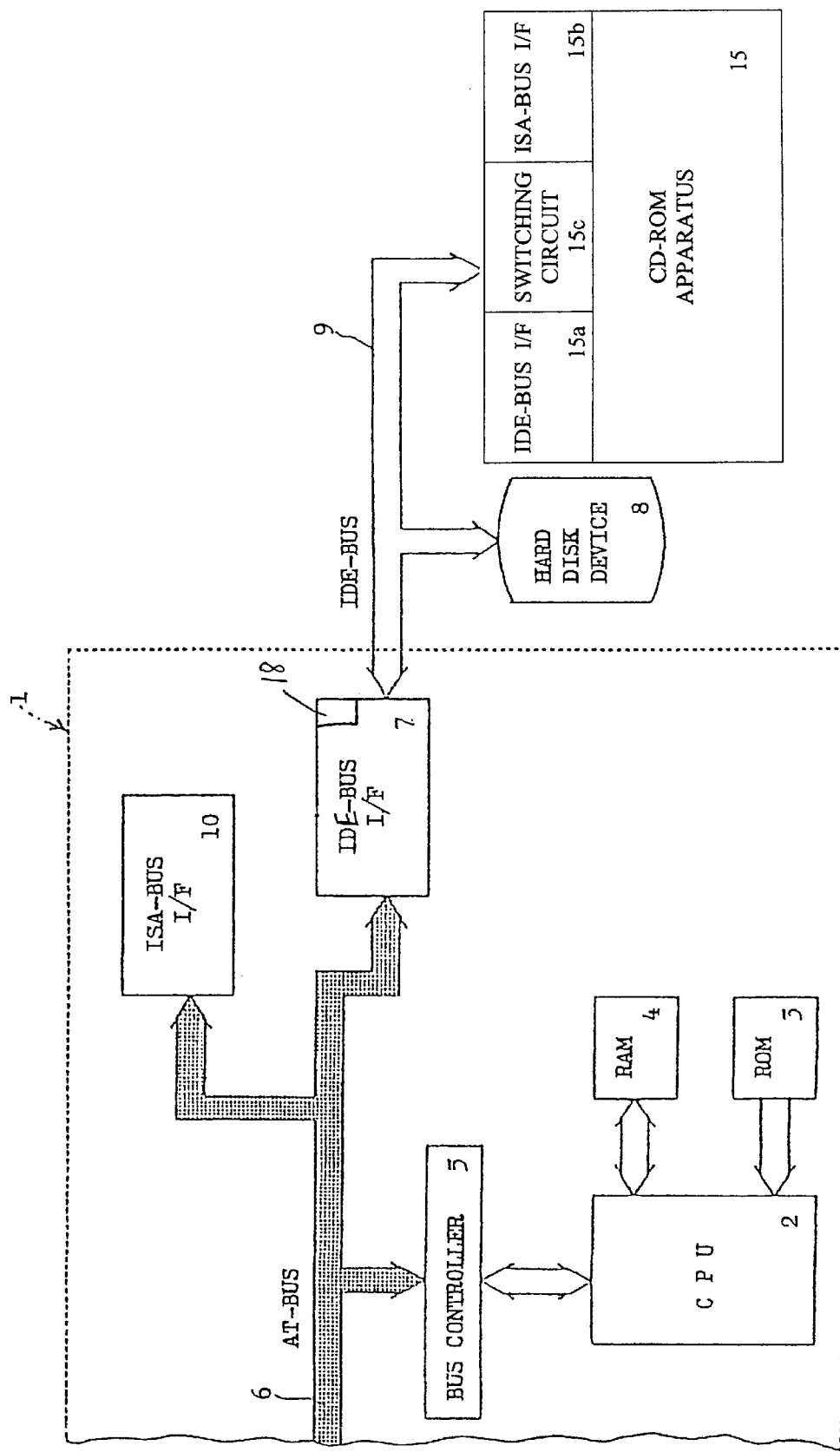
FIG. 1A is a schematic block diagram of a computer system according to another embodiment of this invention.

An embodiment of the present invention will be described in detail with reference to FIG. 1. In FIG. 1, the same reference numerals as those used in prior art of FIG. 2 designate corresponding elements, and a detailed description thereof will be omitted. In FIG. 1, reference numeral 15 denotes a CD-ROM apparatus. An IDE-BUS I/F 15a is added in the CD-ROM apparatus 15. A hard disk unit 8 may be connected as either a master or slave of the IDE-BUS I/F 7 of a personal computer indicated by the numeral 1, and the CD-ROM apparatus 15 may be connected as either a slave or master of the IDE-BUS I/F 7. The IDE-BUS I/F 7 uses 1-bit of a register 18 as a drive selection bit, and determination of which device is to be the master or the slave is selected by switching or toggling this drive selection bit of the register 18 by a CD-ROM driver program.

Figure 2:
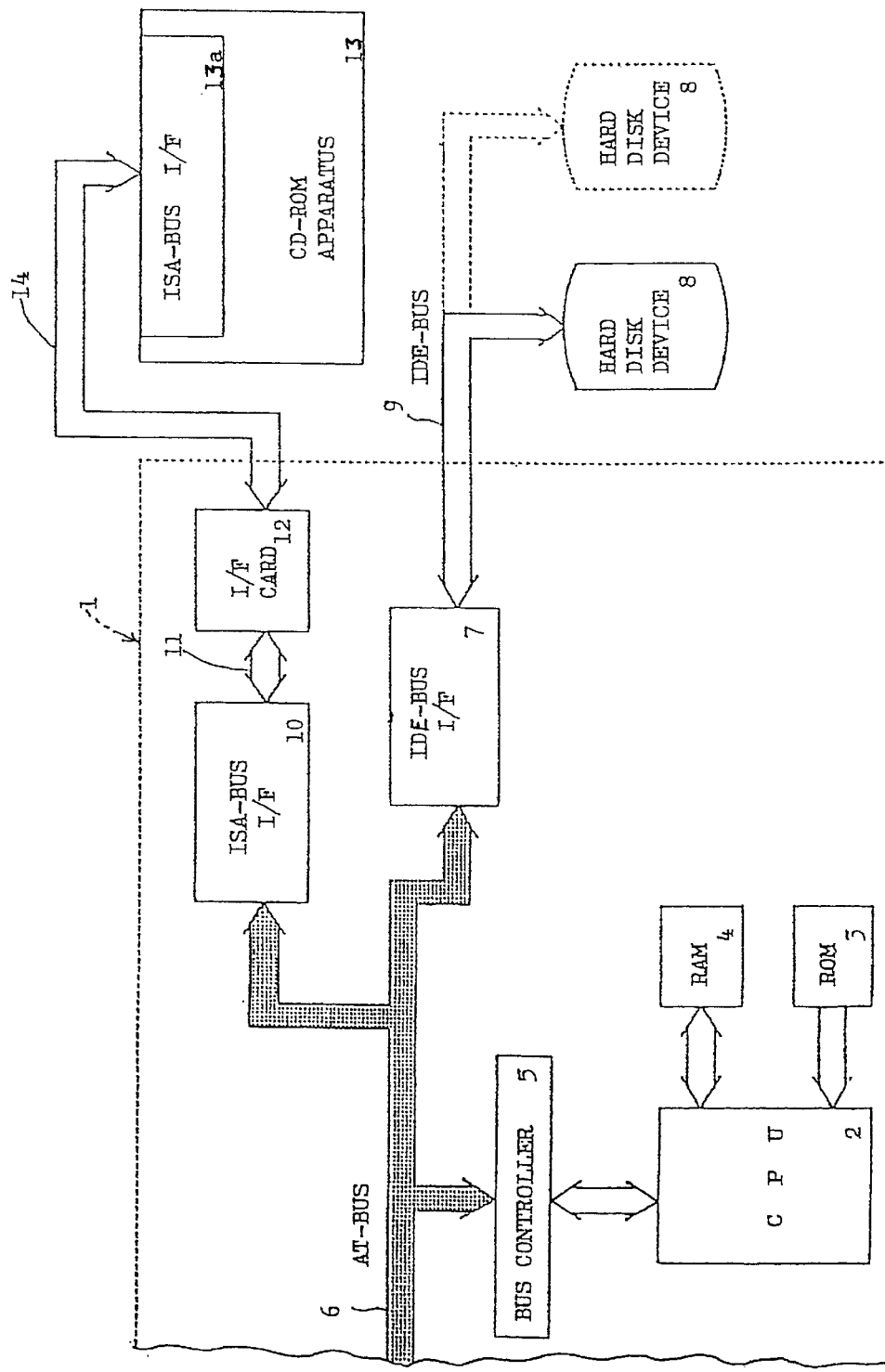

Thus, the I/F CARD connector 12 and the I/F CABLE 14 described with respect to the prior art of FIG. 2 are eliminated from the configuration of this invention which reduces its cost due to deletion of a number of the components and eliminates the work of building the I/F CARD connector 12 into the personal computer 1.

Further, since the CD-ROM driver is moved independently from a BIOS of a system program in a software, it is not necessary to alter the BIOS and other basic program.

Then, the CD-ROM apparatus 15 is selectably connected to the slave or master partition of the IDE-BUS I/F 7 of the personal computer 1, and the hard disk unit 8 is selectably connected to the master or slave partition, respectively, of the IDE-BUS I/F 7, according to the logic state of the drive selection bit of the register 18. The logic state of the drive selection bit of the register 18 is controlled by the computer software process (i.e., CD-ROM driver program).

An IDE-BUS I/F 15a and an ISA-BUS I/F 15b are provided in the CD-ROM apparatus 15, and further switching circuit 15c is added to use both by switching the switching circuit 15c even if the configuration of the personal computer is different.

The present invention may be variously modified within the scope of the spirit of the present invention, and the modifications thereof will be naturally included in the scope of the present invention.

This invention provides, as described above, the CD-ROM apparatus 15 comprising an IDE BUS interface 15a, wherein a hard disk unit 8 and the CD-ROM apparatus 15 are connected in cascade with the IDE interface 7 of the personal computer 1. Therefore the I/F CARD connector 12 and the I/F CABLE 14 (FIG. 2) which were heretofore required to connect the CD-ROM apparatus 13 to the ISA-BUS I/F 10 of the personal computer 1, can be eliminated.

As described above, expenses required for the I/F CARD connector 12 and the I/F CABLE 14 are eliminated along with the cost of labor for building the I/F CARD connector 12 into the computer system 1.

The invention, therefore, is well adapted to carry out the objects and attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An external memory apparatus for use with a personal computer comprising:
   an IDE-BUS interface formed within the external memory apparatus;
   a second interface formed within the external memory apparatus;
   a switching circuit coupled to said IDE-BUS interface and said second interface; and
   a single BUS interface only coupled between the external memory apparatus and the personal computer,
   whereby said IDE-BUS interface and said second interface may be selectively used by switching said switching circuit depending upon a configuration of the personal computer and the single BUS interface.

2. An external memory apparatus for use with a personal computer as in claim 1 wherein:
   the external memory apparatus reproduces a function of a CD-ROM apparatus.

3. An external memory apparatus for use with a personal computer as in claim 1 wherein:
   the external memory apparatus comprises a CD-ROM apparatus.

4. An external memory apparatus for use with a personal computer as in claim 1 wherein:
   said second interface comprises a ISA-BUS interface.

5. A personal computer system comprising:
   a personal computer having a first and second computer BUS interface;
   an external memory apparatus coupled to said personal computer;
   a first external memory apparatus BUS interface formed within said external memory apparatus;
   a second external memory apparatus BUS interface formed within said external memory apparatus;
   a switching circuit formed within said external memory apparatus and coupled to said first and second external memory apparatus BUS interface; and
   a single one only of the first and second computer BUS interfaces coupled between said external memory apparatus and said personal computer system,
   whereby either of said first and second external memory apparatus BUS interfaces may be selectively used by switching said switching circuit depending upon a configuration of said personal computer and the single one only of the first and second computer BUS interfaces.

6. A personal computer system as in claim 5 wherein:
   said external memory apparatus comprises a CD-ROM apparatus.

7. A personal computer system as in claim 5 wherein:
   said first external memory apparatus BUS interface comprises an IDE-BUS interface; and
   said second external memory apparatus BUS interface comprises a ISA-BUS interface.

8. An external memory apparatus for use with a personal computer comprising:
   a first interface formed within said external memory apparatus;
   a second interface formed within said external memory apparatus; and
   a single BUS interface only coupled between the external memory apparatus and the personal computer,
   whereby either of said first and second interface may be selectively coupled to the personal computer depending upon a configuration of the personal computer and the single BUS interface.

9. An external memory apparatus for use with a personal computer as in claim 8 wherein:
   the external memory apparatus comprises a function for reproducing CD-ROM apparatus.

10. An external memory apparatus for use with a personal computer as in claim 8 wherein:
    the external memory apparatus comprises CD-ROM apparatus.

11. An external memory apparatus for use with a personal computer as in claim 8 wherein:
    said first interface comprises IDE-BUS interface.

12. An external memory apparatus for use with a personal computer as in claim 8 wherein:
    said second interface comprises ISA-BUS interface.

13. A personal computer system comprising:
    a personal computer having a first and second computer BUS interface;
    an external memory apparatus coupled to said personal computer;
    a first external memory apparatus BUS interface formed within said external memory apparatus;
    a second external memory apparatus BUS interface formed within said external memory apparatus; and
    a single BUS interface only coupled between said external memory apparatus and said person computer,
    whereby either of said first and second interface may be selectively coupled to said personal computer depending upon a configuration of said personal computer and the single BUS interface.

14. A personal computer system as in claim 13 wherein:
    said external memory apparatus comprises a function for reproducing CD-ROM apparatus.

15. A personal computer system as in claim 13 wherein:
    said external memory apparatus comprises CD-ROM apparatus.

16. A personal computer system as in claim 13 wherein:
said first interface comprises IDE-BUS interface.

17. A personal computer system as in claim 13 wherein:
said second interface comprises ISA-BUS interface.

18. A CD-ROM external memory apparatus for use with a personal computer comprising:
- an IDE-BUS interface provided in the CD-ROM external memory apparatus;
- an ISA-BUS interface provide in the CD-ROM external memory apparatus;
- a switching circuit coupled to said IDE-BUS interface and said ISA-BUS interface; and
- a single BUS interface only coupled between the CD-ROM external memory apparatus and the person computer,
- whereby said IDE-BUS interface and said ISA-BUS interface may be selectively used by switching said switching circuit even if the configuration of the personal computer is different.

* * * * *